United States Patent [19]
Forsberg

[11] 3,814,253
[45] June 4, 1974

[54] LIQUID CONTROL APPARATUS FOR CHROMATOGRAPHY COLUMNS

[76] Inventor: K. Holger Forsberg, Sokentehdas, Kotka, Finland

[22] Filed: Mar. 26, 1973

[21] Appl. No.: 345,234

Related U.S. Application Data

[63] Continuation of Ser. No. 185,548, Oct. 1, 1971, abandoned.

[52] U.S. Cl.............. 210/97, 210/242, 210/198 C
[51] Int. Cl............................................ B01d 15/08
[58] Field of Search.................. 210/97, 242, 198 C

[56] References Cited
UNITED STATES PATENTS

| | | | |
|---|---|---|---|
| 2,365,221 | 12/1944 | Shafor................................ | 210/24 |
| 2,802,573 | 8/1957 | Weatherly.......................... | 210/289 |
| 2,967,148 | 1/1961 | Karnofsky.......................... | 208/310 |
| 3,474,908 | 10/1969 | Catravas .......................... | 210/198 C |
| 3,510,278 | 5/1970 | Emneus et al. .............. | 210/198 C X |
| 3,511,377 | 5/1970 | Hrdina............................... | 210/198 C |
| 3,487,938 | 1/1970 | Patterson ........................ | 210/198 C |
| 3,666,105 | 5/1972 | Fox, Jr. ............................ | 210/198 C |

Primary Examiner—John Adee
Attorney, Agent, or Firm—Brumbaugh, Graves, Donohue & Raymond

[57] ABSTRACT

Flow control apparatus for a chromatographic fractionating column includes a liquid-pervious plate assembly adapted to float on the liquid layer overlying an ion exchange resin bed within the column and a detection device carried by the assembly responsive to the thickness of the liquid layer reaching a predetermined minimum for opening a normally closed valve to supply additional liquid to the column so as always to maintain a liquid cover over the bed. The minimum thickness of the liquid layer is such that the underside of the plate assembly, formed in part by an open-mesh net, penetrates the upper surface of the bed, thereby periodically smoothing out irregularities. A timer holds the valve mechanism open until sufficient liquid has been added to refloat the plate assembly. The plate assembly is formed with a multiplicity of holes of a cross-sectional size and obliquity to the vertical such that the liquid, added to the column from above, cannot impact directly on the resin bed surface.

16 Claims, 3 Drawing Figures

LIQUID CONTROL APPARATUS FOR CHROMATOGRAPHY COLUMNS

This is a continuation, of application Ser. No. 185,548 filed Oct. 1, 1971 now abandoned.

BACKGROUND OF THE INVENTION

This invention relates in general to ion exchange operations carried out in chromatographic fractionating columns, and is particularly concerned with apparatus for controlling the quantity of liquid overlying the ion exchange resin bed of the column and for maintaining the upper surface of the bed in a smooth condition so as to promote uniform flow distribution across the cross-section of the bed.

Typically, in ion exchange chromatography the elements to be separated are sorbed from solution in a narrow band at the top portion of an ion exchange resin bed and are then eluted, i.e., washed down the bed, by passing a selective complexing agent through the column until separation is achieved. The washing liquid, or eluant, is added to the column near the top in the form of a spray that falls onto the resin bed over its full cross-section. This, however, frequently disturbs the upper surface of the bed, rendering it uneven, and leads to non-uniform liquid distribution and channelling within the bed. Such conditions are particularly undesirable inasmuch as they have a pronounced deleterious effect on the efficiency of the ion exchange processes.

It is desirable in ion exchange operations of the foregoing type to maintain a liquid cover over the resin bed at all times, but to keep the quantity of this liquid to a minimum. This has been a problemsome area in prior art devices because of the swelling and shrinking of the resin bed, and the consequent vertical movement of its upper surface, which occurs during various steps of the separation process.

The present invention fulfills these and other requirements of the prior art.

SUMMARY OF THE INVENTION

In accordance with the invention, the liquid layer covering the ion exchange resin bed employed in a chromatographic fractionating column is automatically maintained within predetermined limits such that the upper surface of the resin bed is never exposed above the liquid level but that the quantity of solution overlying the resin surface is as small as practicable. This is accomplished by controlling the quantity of fresh liquid supplied to the column in accordance with the height of the liquid layer above the resin bed surface, such control being effected by a plate assembly which floats on the liquid layer and carries a detection device operative to open a valve in the liquid supply system upon the thickness of the liquid layer reaching a lower limit.

Provision is made, preferably by means of a timing mechanism, to close the valve after a sufficient amount of liquid has been added to the column to float the plate assembly above the resin bed. By thus referencing the input of fresh solution to the column to the thickness of the liquid layer above the resin bed surface, the quantity of liquid overlying the surface is controlled in accordance with the invention irrespective of whether the resin bed surface moves up or down within the column.

It is a feature of the invention that the minimum thickness is such that the plate assembly contacts the upper surface of the resin bed and thereby tends to smooth out irregularities in the surface. To enhance this effect, the underside of the plate assembly is in part formed by an open-mesh net that penetrates the surface of the bed.

As a further feature of the invention, the plate has a horizontal cross-section generally conforming to, but smaller than that of the interior of the column and is formed with a multiplicity of holes that communicate with the upperside and underside of the assembly to convey the fresh liquid through the assembly. The individual holes are inclined, i.e., oblique, to the vertical and of a horizontal cross-sectional size such that the liquid falling from above cannot pass directly through the plate assembly without contacting the sidewalls of the holes. In this way, the surface of the resin bed is protected against disruption resulting from direct impacting of the liquid spray.

BRIEF DESCRIPTION OF THE DRAWINGS

For a better understanding of the invention, reference may be made to the following description of an exemplary embodiment, taken in conjunction with the figures of the accompanying drawings in which.

DESCRIPTION OF AN EXEMPLARY EMBODIMENT

Figure 1:
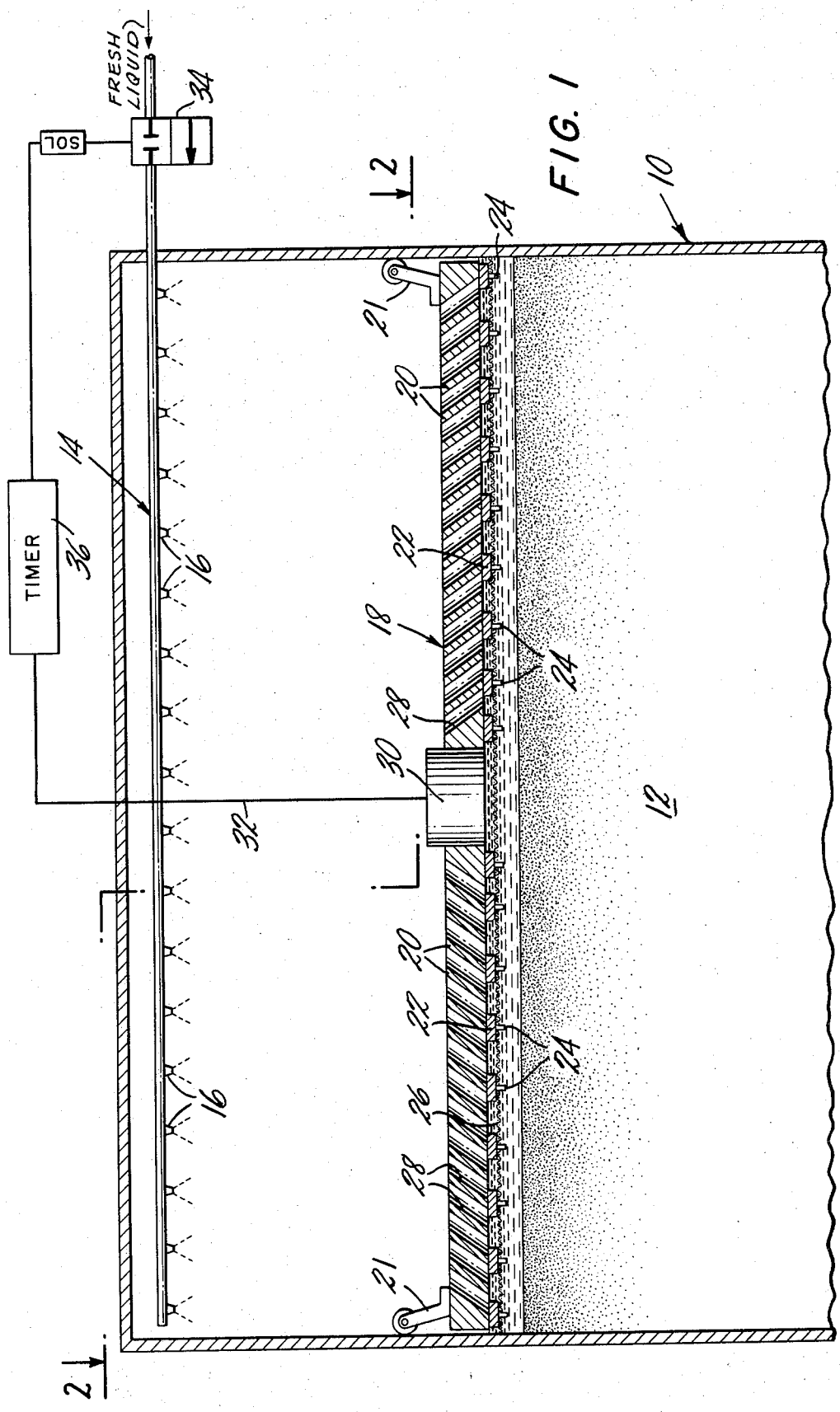
FIG. 1 is an elevational view, partly in section, of a chromatography column equipped with the plate assembly and liquid control components of the present invention.

FIG. 1 illustrates a chromatography column 10 containing an ion exchange resin bed 12 in a lower portion of the column and a liquid supply system 14, including a plurality of spray nozzles 16, for introducing fresh liquid, or solution, into the column near the top, whence it falls in the form of a spray to the resin bed 12 to elute the products to be separated. According to conventional practice, the separated products are continuously drawn off at the bottom of the column.

The resins used in ion exchange procedures of the type referred to are normally of a very small bead size and typically have a density close to that of the liquid solution. Accordingly, the surface of the bed is easily disturbed and rendered irregular, leading to serious interference with the proper progress of the separation procedure. As one feature of the invention, such disruption of the resin bed surface is prevented while at the same time proper feeding of fresh solution to the bed is afforded.

Figure 2:
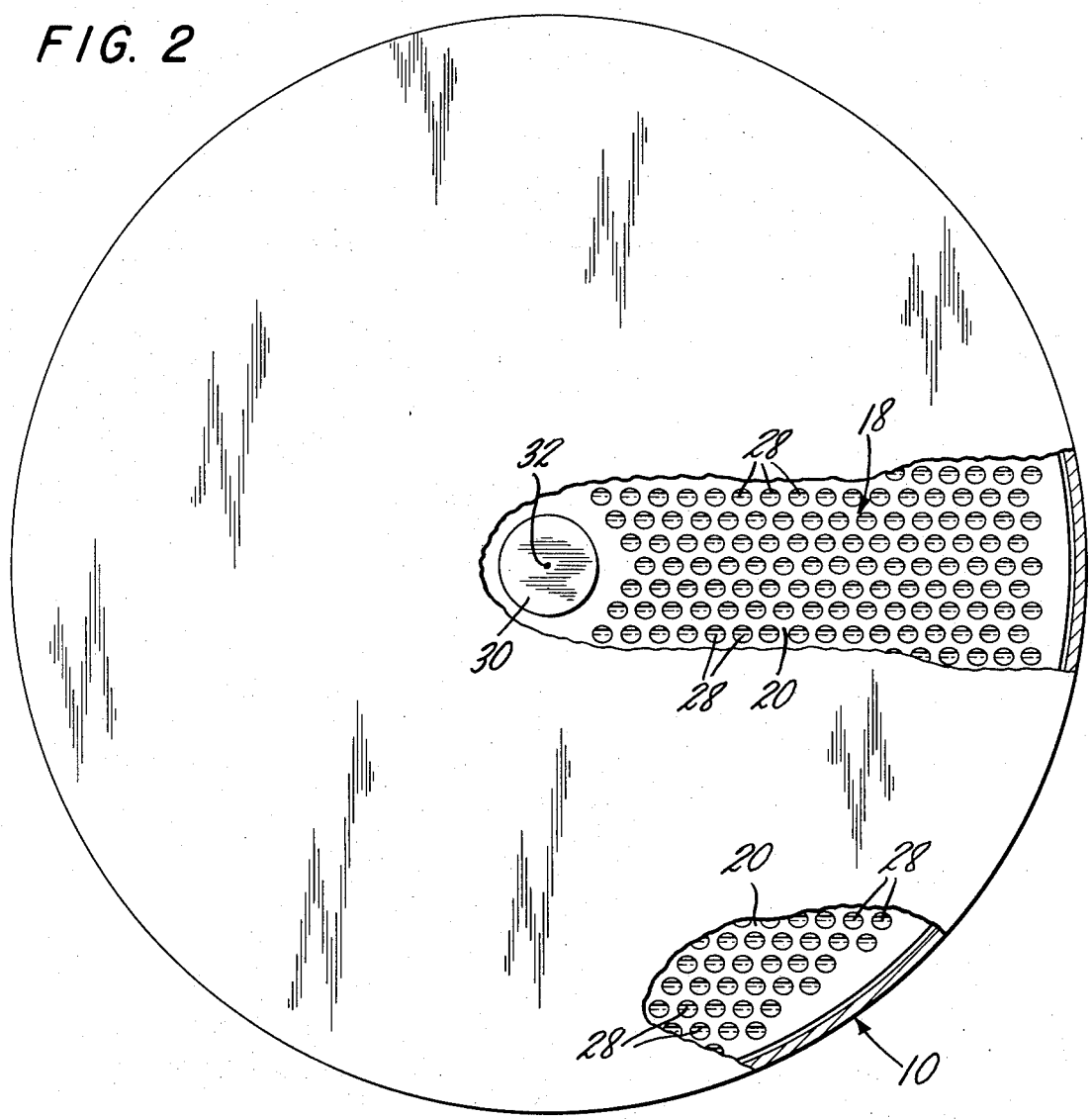
FIG. 2 is a horizontal view, partly in section, taken along the line 2—2 of FIG. 1 and looking in the direction of the arrows.
Figure 3:
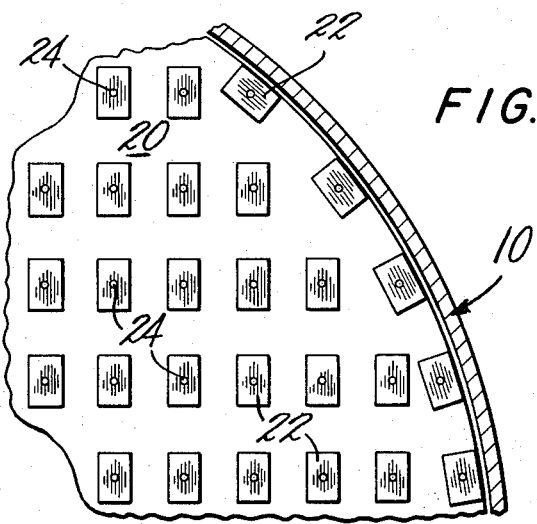
FIG. 3 is a detail view of a portion of the underside of the plate assembly of FIG. 1, with the open-mesh net and holes omitted for clarity of illustration.

In FIGS. 1 and 2, therefore, a plate assembly 18 constructed according to the invention includes an upper plate 20 having a horizontal cross-section generally conforming to but smaller than the interior horizontal cross-section of the column 10. (see FIG. 2) The assembly 18 is thus free to move vertically within the column and is equipped with guide wheels 21 to that end. It additionally includes a plurality of blocks 22 (see also FIG. 3) affixed to the underside of the plate 20. Suspended from the blocks 22, by means of bolts 24, is an open-mesh net 26 that forms, along with the bolts 24, the underside of the plate assembly 18.

The plate 20 and blocks 22 preferably are composed of lightweight material, such as, for example, polyurethane foam, so that the assembly will float on the liquid over-lying the resin bed 12. Suitably, the plate 20 and blocks 22 may be coated with an epoxy resin to protect them from being damaged by the solution or separation products. The net 26 similarly is constructed of an appropriate resistant material.

A multiplicity of holes 28 are formed in the plate 20 to convey the liquid falling from above through the assembly 18 to the resin bed 12. According to the invention, the holes 28 are given a horizontal cross-section (FIG. 2) and an obliquity to the vertical (see FIG. 1) such that the liquid falling from the nozzles 16 cannot pass directly through the plate assembly 18 without contacting the sidewalls of the holes. In this manner the liquid is prevented from impacting directly on the upper surface of the resin bed 12 and hence from disturbing its smoothness. It will be appreciated that various different hole sizes and inclinations may be used for this purpose. As illustrated in FIG. 2, the holes 28 are substantially uniformly distributed over the horizontal extent of the plate member 20, thereby insuring a uniform flow of the fresh liquid over the full cross-section of the bed 12. Preferably, the holes should constitute approximately 20 to 50 percent of the total surface area of the plate 20.

As already mentioned, it is desirable that the resin bed 12 always be covered with liquid but that the quantity of the covering liquid be kept to a minimum. It is in this connection that the plate assembly 18 is adapted to float on the liquid layer overlying the bed and is also provided centrally with a device 30 for detecting, i.e., sensing, the thickness of the liquid layer above the upper surface of the resin bed 12. The detection device 30 may be of any suitable type, e.g., acoustic, capacitive or conductivity based. Its output is connected through a conductor 32 to a normally closed valve 34 in the liquid supply system 16. The valve 34 may conveniently be of the two-way solenoid type, operative upon receipt of an outlet signal from the detection device 30 to open the valve 34 and allow liquid to flow to the spray nozzles 16.

The detection device 30 is preset to open the valve 34 when the thickness of the liquid layer above the resin bed 12 falls to the predetermined minimum amount. This minimum amount is such that the plate assembly 18 is no longer floating, but contacts and rests on the upper surface of the bed 12. A typical minimum thickness for the liquid layer would be on the order of 10 mm above the resin surface. When the minimum layer thickness is reached, the valve 34 opens and is retained in that position by a timer 36 in the valve actuation circuit for an elapsed time from the opening of the valve sufficient to allow enough fresh liquid to be added to the column to float the plate assembly 18. For example, the timer 36 might retain the valve 34 in the open position until the liquid layer rises to the height of 50 mm above the resin surface. The liquid level then begins to fall again, until the plate assembly 18 is once more resting on the surface of the bed and the cycle is repeated.

With the foregoing exemplary values for the minimum and maximum layer thickness, the surface level of the solution above the resin is maintained, on the average, at approximately 30 mm.

As another feature of the invention, the periodic engagement of the plate assembly 18, as it settles and is refloated, with the resin bed surface performs the additional function of tending to maintain the resin surface in a smooth, even state. Hence, the hole size of the open mesh net 26 is selected so that the net will penetrate the resin surface when the plate assembly 18 comes to rest on the bed 12. A suitable hole size might be, for example, approximately 10 mm, with a mesh thickness of from 1 to 3 mm. By virtue of this periodic agitation and levelling of the resin surface, any irregularities or roughness which might appear in the surface are recurrently erased and the surface restored to a substantially uniform, smooth, planar condition. An equalized flow of solution over the full cross section of the bed 12 is thus ensured.

Although the invention has been described herein with reference to a specific embodiment thereof, it will be understood by those skilled in the art that the embodiment is susceptible of modification and variation without deviating from the spirit and scope of the invention. For example, the timer 36 and solenoid valve 34 may be replaced by equivalent flow control devices for effecting on-off regulation of fresh liquid flow to the column 10. In a similar vein, although only a single detecting device 30 is illustrated, one or more additional devices could be utilized to detect the thickness of the liquid layer at locations other than the central position. All such variations and modifications, therefore, are intended to be included in the scope of the appended claims.

I claim:

1. Liquid control apparatus for a chromatographic fractionating column containing a generally horizontal ion exchange resin bed and having fresh liquid supplied thereto above the bed to form a liquid layer overlying the upper surface of the bed, comprising:
   a liquid-pervious plate assembly adapted to float on the liquid layer and having a horizontal cross-section generally coextensive with but smaller than the interior horizontal cross-section of the column so as to allow vertical movement of the assembly within the column; and
   means, carried in part by the plate assembly, responsive to the thickness of the liquid layer overlying the upper surface of the resin bed reaching a predetermined minimum amount for causing additional liquid to be supplied to the column, whereby at least a minimum quantity of liquid will be maintained above the resin bed at all times independently of whether the upper surface of the bed moves vertically within the column.

2. Apparatus according to claim 1 in which the minimum liquid layer thickness is such that the underside of the plate asembly contacts the upper surface of the resin bed while still providing a liquid cover over the surface, whereby the plate assembly tends periodically to smooth the bed surface.

3. Apparatus according to claim 2 in which the underside of the plate assembly is formed at least in part by an open-mesh net that penetrates the upper surface of the resin bed upon contact of the assembly with the bed.

4. Apparatus according to claim 1 further comprising means for shutting off the supply of liquid to the column after a quantity of liquid sufficient to float the plate assembly above the upper surface of the resin bed has been added thereto.

5. Apparatus according to claim 4 in which:

the means for causing additional liquid to be supplied to the column comprises a device carried by the plate assembly for detecting the thickness of the liquid layer above the resin bed and normally closed valve means for controlling the supply of liquid to the column, the valve means being operative to open upon the receipt of a signal from the detection device, thereby permitting liquid flow to the column; and the means for shutting off liquid supply to the column comprises timer means for returning the valve means to the normally closed position after an elapsed time from the opening of the valve means of sufficient duration to allow enough liquid to be added to the column to float the plate assembly above the resin bed.

6. Apparatus according to claim 1 in which the plate assembly includes means for conveying therethrough to the resin bed liquid falling onto it from above while preventing direct impacting of the falling liquid on the bed surface, thereby protecting the bed surface against disruption and unevenness.

7. Apparatus according to claim 6 in which the liquid conveying means comprises means defining a multiplicity of holes communicating with the upperside and the underside of the plate assembly, the individual holes having a horizontal cross-sectional size and an obliquity to the vertical such that liquid falling from above cannot pass directly through the holes without contacting the side walls thereof.

8. Apparatus according to claim 1 in which the plate assembly includes a multiplicity of holes communicating with the upperside and the underside thereof for conveying fresh liquid therethrough to the resin bed, the holes being uniformly distributed over the horizontal cross section of the plate assembly and occupying from 20 to 50 percent of the total horizontal cross-sectional area of the plate assembly.

9. Apparatus according to claim 1 in which the plate assembly comprises an upper plate member, a plurality of spaced blocks secured to the underside of the plate member and an open-mesh net attached to the undersides of the blocks.

10. In a chromatographic fractionating column for carrying out ion exchange operations having a generally horizontal ion exchange resin bed and a liquid supply system for supplying fresh liquid to the column above the resin bed to form a liquid layer overlying the upper surface of the bed, the improvement comprising:

a liquid-pervious plate assembly adapted to float on the liquid layer and having a horizontal cross-section generally coextensive with but smaller than the interior horizontal cross-section of the column so as to allow vertical movement of the assembly within the column;

valve means in the liquid supply system for controlling the flow of liquid to the column; and means carried by the plate assembly responsive to the thickness of the liquid layer overlying the upper surface of the resin bed reaching a predetermined minimum amount for opening the valve means to supply additional liquid to the column, whereby at least a minimum quantity of liquid will be maintained above the resin bed at all times independently of whether the upper surface of the bed moves vertically within the column due to expansion or contraction of the resin.

11. A chromatographic fractionating column according to claim 10 in which the improvement further comprises means for closing the valve means to shut off liquid flow to the column after a quantity of liquid sufficient to float the plate assembly above the bed surface has been added thereto.

12. A chromatographic fractionating column according to claim 11 in which the means for closing the valve means comprises timer means operative to close the valve means after an elapsed time from its opening of sufficient duration to allow enough liquid to be added to the column to float the plate assembly above the resin bed.

13. A chromatographic fractionating column according to claim 10 in which the plate assembly includes means for conveying therethrough to the resin bed liquid falling onto it from above while preventing direct impacting of the falling liquid on the bed surface, thereby protecting the bed surface against disruption and unevenness.

14. A chromatographic fractionating column according to claim 13 in which the liquid conveying means comprises means defining a multiplicity of holes communicating with the upperside and the underside of the plate assembly, the individual holes having a horizontal cross-sectional size and an obliquity to the vertical such that liquid falling from above cannot pass through the holes without contacting the sidewalls thereof.

15. A chromatographic fractionating column according to claim 10 in which the minimum liquid layer thickness is such that the underside of the plate assembly contacts the upper surface of the resin bed while still providing a liquid cover over the surface, whereby the plate assembly tends periodically to smooth the bed surface.

16. A chromatographic fractionating column according to claim 15 in which the underside of the plate assembly is formed at least in part by an open-net mesh that penetrates the upper surface of the resin bed upon contact of the assembly with the bed.

* * * * *

PO-1050
(5/69)

UNITED STATES PATENT OFFICE
CERTIFICATE OF CORRECTION

Patent No. 3,814,253          Dated June 4, 1974

Inventor(s) K. Holger Forsberg

It is certified that error appears in the above-identified patent and that said Letters Patent are hereby corrected as shown below:

First page should indicate that patent has been assigned to Suomen Sokeri Osakeyhtio (Finnish Sugar Company), Finland;

Col. 4, line 3 of claim 2, "asembly" should read --assembly--; and

Col. 6, last line of claim 14, "sidewalls" should be --side walls--.

Signed and sealed this 22nd day of October 1974.

(SEAL)
Attest:

McCOY M. GIBSON JR.
Attesting Officer

C. MARSHALL DANN
Commissioner of Patents